3,131,736
PORTABLE MOTOR DRIVEN JIG SAW
Edward W. Ristow, Wauwatosa, and Jerome L. Schnettler, Milwaukee, Wis., assignors to Milwaukee Electric Tool Corporation, Milwaukee, Wis., a corporation of Wisconsin
Filed Apr. 10, 1961, Ser. No. 101,837
5 Claims. (Cl. 143—68)

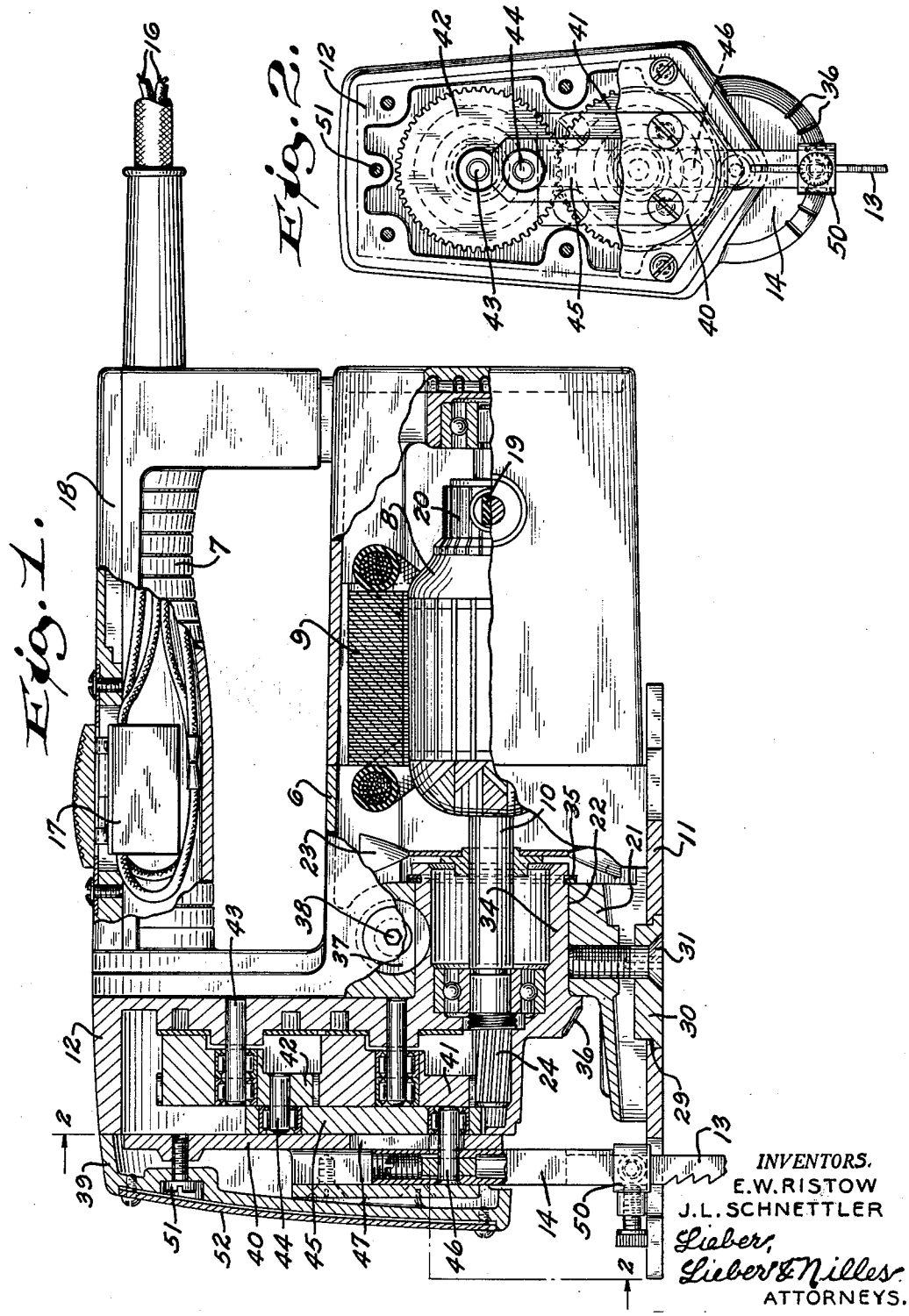

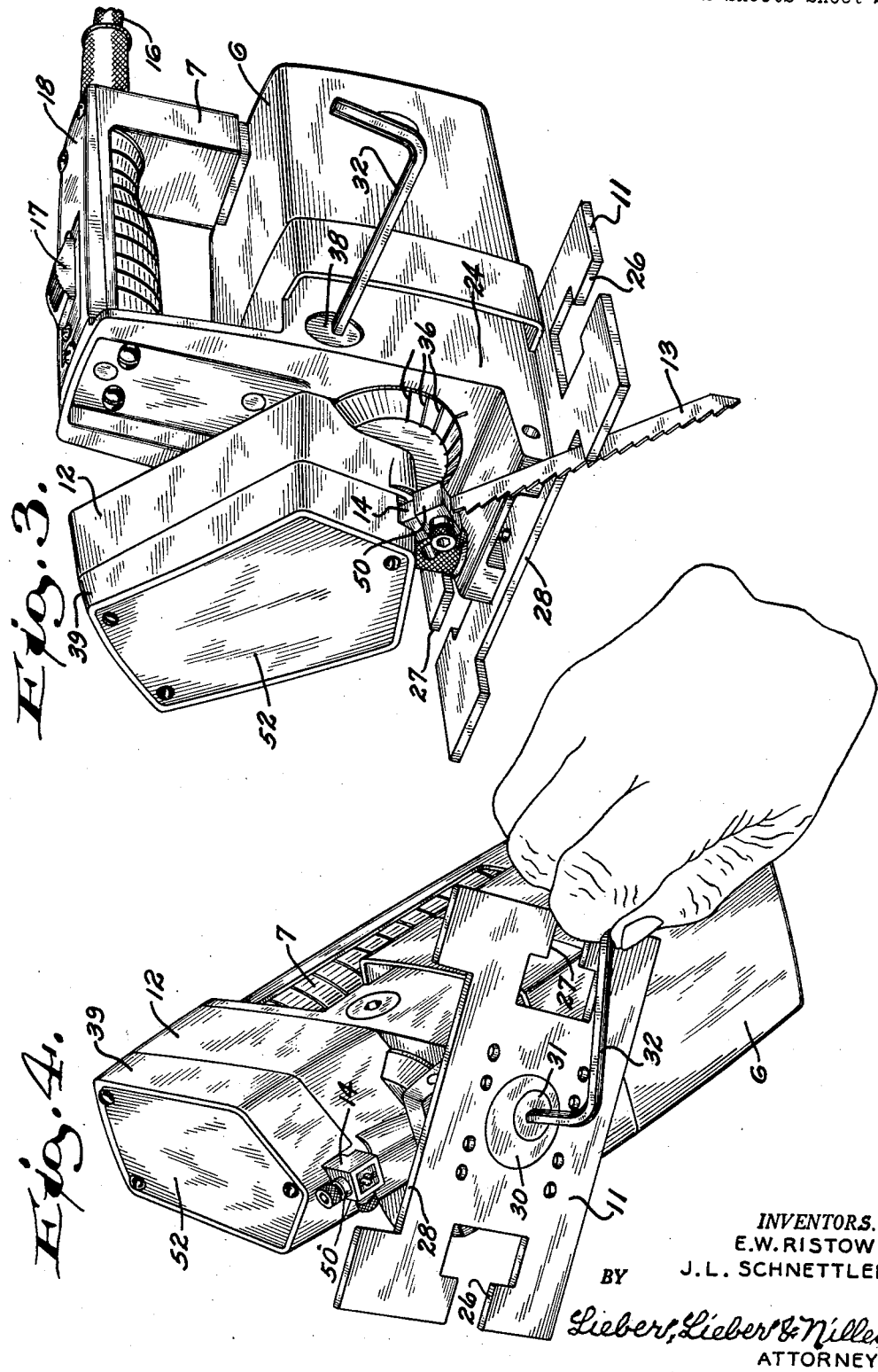

The present invention relates generally to improvements in the art of sawing, and it relates more specifically to improvements in the construction and operation of portable power driven reciprocable saw units.

The primary object of this invention is to provide an improved portable jig saw unit which is simple in construction and extremely flexible in adaptation.

Many different types of motor driven jig saw assemblages have heretofore been proposed and marketed, and in some of these prior devices an electric motor confined within a manipulating housing was drivingly connected through speed reducing transmission gearing concealed within a protective casing with the reciprocable saw blade holder. It was also customary to provide such jig saw units with a supporting base for properly positioning them relative to the work, and while these prior portable jig saws were well adapted to cut along a plane disposed perpendicular to the base it was necessary in order to produce miter or inclined saw cuts to bodily tilt the entire structure including the motor housing and/or the base plate to the desired angle of cutting. Then, too, most of these prior portable saws were relatively complicated and expensive which also being difficult to maintain without frequent repairs.

It is therefore an important object of the present invention to provide an improved portable power driven jig saw assemblage which obviates all of the undesirable features of such prior devices, and which is adapted to conveniently and accurately produce miters and other desired angular cuts without undesirably displacing the manipulating and blade actuating elements.

Another important object of this invention is to provide an electric motor driven jig saw unit wherein diverse saw cuts may be produced with utmost precision at any angle relative to the supporting base by merely tilting the blade guiding structure to the desired angle and without swinging the base out of its normal position for perpendicular cutting.

Still another important object of the invention is to provide a compact and durable portable jig saw structure which can be quickly and conveniently adjusted to meet diverse conditions of usage, and which may be effectively utilized to perform different kinds of sawing operations.

An additional object of the present invention is to provide an attractive and sturdily constructed jig saw which can be manipulated with utmost safety, and wherein delicate working parts are well protected against damage.

These and other more specific objects and advantages of the invention will be apparent from the following detailed description.

A clear conception of the features constituting the present improvements and of the construction and operation of a typical portable motor driven jig saw unit embodying the invention, may be had by referring to the drawings accompanying and forming a part of this specification wherein like reference characters designate the same or similar parts in the various views.

FIG. 1 is a part sectional side elevation of a portable electric motor driven jig saw assemblage, the section having been taken centrally and longitudinally through the unit substantially along a vertical plane;

FIG. 2 is a part sectional end view of the saw blade supporting casing which is angularly adjustable relative to the motor housing in order to vary the cutting angle;

FIG. 3 is an end and side perspective view of the same jig saw unit showing the blade supporting casing adjusted to effect miter sawing, and with the casing locking wrench still in place; and FIG. 4 is a bottom, end and side perspective view of the assemblage illustrating the manner in which the base plate may be adjusted relative to the motor housing and saw blade supporting casing.

While the invention has been shown and described herein as having been embodied in a portable electric motor driven jig saw unit of a specific type having the motor housing provided with a manipulating handle at the top through which the electric current is conducted to the propelling motor, it is not desired to confine the use of the improved features to such a specific assemblage; and it is also contemplated that specific descriptive terms employed herein be given the broadest possible interpretation consistent with the actual disclosure.

Referring to the drawings, the portable jig saw shown therein, comprises in general, a main housing 6 having an upper manipulating handle 7; an electric motor having an armature 8 rotatably disposed in a field 9 confined within the housing 6, the motor being provided with a power delivery shaft 10 journalled in and protruding throuh an end wall of the housing; a base plate 11 adjustably secured to the bottom of the housing 6; a saw blade supporting casing 12 swingably suspended from the housing 6 and having therein speed reducing and motion transmitting mechanism drivingly connected to the motor shaft 10; and a saw blade 13 attached to an actuator 14 reciprocable by the mechanism confined within the casing 12.

The main housing 6 is preferably formed of light but durable metal such as aluminum, and the handle 7 is formed hollow for extension of the motor energizing conductors 16 therethrough and which are provided with a control switch 17 mounted upon a removable top handle cover 18 and are connected with brushes 19 coacting with the motor commutator 20. The end wall of the housing 6 naerest to the saw blade 13, has a thickened lower portion 21 in which the motor shaft 10 is journalled and which is provided with a relatively large bore 22 formed coaxially relative to this shaft; and the shaft 10 has a motor ventilating fan 23 secured thereto inwardly of this bore 22 while the protruding shaft end is provided with a pinion 24, see FIG. 1.

The base plate 11 is preferably formed of durable sheet metal, and is of generally rectangular shape with one straight side and with cut-outs or notches 26, 27, 28 formed in the other three sides, as depicted in FIG. 4. The notches 26, 27 are of similar formation and are located at opposite ends of the elongated plate 11, while the notch 28 is considerably longer and disposed opposite to the straight side of the plate. The center of the plate 11 mid-way between the notches 26, 27 and between the straight side and the innermost edge of the notch 28, is provided with a circular opening having an annular flange 29 with which an eccentric disk 30 is cooperable, and this disk is adapted to be locked against the enlarged housing portion 21 by means of a screw 31 as shown in FIG. 1, with the aid of a screw driver or a wrench 32 as in FIG. 4.

The saw blade supporting casing 12 is likewise formed of light metal and has its side adjacent to the housing 6 provided with an integral pivot hub 34 which is rotatably but snugly confined within the housing bore 22 by a snap ring 35, so that the casing 12 may be swingably adjusted about the axes of the drive shaft 10 to any desired angular position relative to the main housing 6 as indicated by the calibrations 36 formed on the casing and which are cooperable with a mark on the housing portion 21, see FIGS. 2 and 3. The casing 12 is adapted to be locked in any desired position of angular adjustment by means of a wedge block 37 coacting with the housing 6 and with the hub 34 and which is movable into and out of locking position by a screw 38 with the aid of a screw driver or another wrench 32 as shown in FIGS. 1 and 3. During such angular adjustment of the casing 12 relative to the housing 6, the adjacent flat surfaces of these elements are slidably cooperable.

The casing 12 is also provided with a removable cover 39 having therein a slotted guide plate 40, and the speed reducing and transmitting mechanism which is confined within this casing 12 comprises a relatively large gear 41 meshing with the pinion 24 and with a second similarly enlarged gear 42 both of which are journalled for rotation on stub shafts 43 mounted in the casing 12, see FIGS. 1 and 2. The second gear 42 is provided with an eccentric pin 44 which coacts with one end of a link 45, and both of the gears 41, 42 are counter-weighted as shown in FIG. 1 in order to eliminate excessive vibration. The link 45 is reciprocable by the eccentric pin 44 between the gears 41, 42 and one side of the guide plate 40, and the opposite end of this link coacts with another pin 46 which is guided for rectilinear reciprocation in a rectilinear slot 47 formed in the guide plate 40.

The opposite side of the plate 40 is provided with a rectilinear guiding groove 49 in which the saw blade actuator 14 is reciprocable by the protruding end of the pin 46 as this pin travels back and forth within the slot 47, and the lower outer end of the elongated actuator 14 is provided with clamp 50 for firmly but detachably securing jig saw blades 13 to the holder. The casing cover 39 which normally conceals and protects the transmission mechanism is detachably secured to the guide plate 40 as by means of screws 51, and an identifying plate 52 may also be applied to the cover 39 so as to complete the unit as shown in FIGS. 3 and 4. All of the bearings for relatively rotatable parts are preferably of the anti-friction type in order to eliminate excess friction.

When the improved motor driven jig saw unit has been properly constructed and assembled as above described its operation is as follows. Depending upon the type of work to be done, the base plate 11 should first be adjusted with the aid of the eccentric 30, screw 31 and a wrench 32 as depicted in FIG. 4, so as to bring a selected notch 26, 27, 28 beneath and in vertical alignment with the saw blade actuator 14. If the proposed saw cut is to be perpendicular relative to the base plate 11 either of the notches 26, 27 may be thus positioned, but if it is intended to make an inclined or miter cut then the elongated notch 28 should be positioned in alignment with the blade actuator 14, as in FIG. 3. After the plate 11 has been thus properly positioned and locked in place, a selected type of saw blade may be firmly attached to the actuator 14 with the aid of the clamp 50.

When making perpendicular cuts the unit may be advanced either along a curved or irregular path with the aid of the handle 7, or the straight edge of the plate 11 may be utilized to guide the device along a rectilinear wall or the like located on either side of the unit, and by manipulating the switch 17 associated with the handle 7, the electric motor may be operated to rapidly reciprocate the saw blade 13 and to thereby produce the desired cut while the unit is being advanced. When producing perpendicular cuts the casing 12 will be positioned so that the blade 13 will reciprocate perpendicular to the plate 11, but this casing may be readily set at any oblique angle relative to the main housing 6 with the aid of the calibrations 36 to produce angular cuts inclined up to 45° relative to the perpendicular plane in either direction, thus permitting accurate production of miter joints. Such angular sawing can obviously be effected without laterally tilting the motor housing 6 or the base plate 11.

From the foregoing description of the construction and operation of the improved jig saw unit it will be apparent that the present invention in fact provides a portable power driven jig saw which is extremely flexible in adaptation to accurately produce either perpendicular or angular cuts without lateral tilting of the main housing. The casing 12 which effectively conceals and protects the motion transmitting mechanism can be conveniently adjusted to insure accurate cutting at any angle relative to the base plate 11 and locked in the desired angular position, while the base plate 11 may also be readily adjusted relative to the housing 6 and casing 12 so as to provide maximum support and proper guiding of the advancing unit along guideways disposed on either side and close to the housing. The entire asesmblage is compact, light weight, easily manipulable, and sturdy in structure, while also being devoid of excessive friction losses.

Various modes of carrying out the invention are contemplated as being within the scope of the following claims particularly pointing out and distinctly claiming the subject matter which is regarded as the invention.

We claim:

1. A portable jig saw comprising, a housing having an end wall provided with a bore, an electric motor confined within said housing and having a power delivery shaft extending centrally through said bore, a casing having a laterally projecting pivot sleeve rotatably confined within said bore whereby said casing is angularly adjustable about the axis of said motor shaft, motion transmitting mechanism confined within said casing and drivingly connected to said shaft, a saw blade actuator carried by said casing for angular adjustment therewith and reciprocable by said mechanism in a plane transverse to said motor shaft, a blade carried by and extending from said blade actuator, a base plate for said housing disposed in a plane transverse to the plane of reciprocation of said blade, said base plate having a plurality of peripheral notches of various widths registrable with said blade, the widest notch accommodating said blade at the limits of the angular adjustment of said casing, and means securing said base plate to said housing in selected positions of angular adjustment about a pivot axis perpendicular to the plane of said base, whereby a selected one of said notches is registrable with the plane of reciprocation of said blade actuator dependent upon the angular adjustment of the casing relative to the motor housing.

2. A portable jig saw according to claim 1, wherein the means for effecting angular adjustment of the casing about the axis of the motor shaft includes locking means.

3. A portable jig saw according to claim 2, wherein the locking means for the casing includes means coacting with the pivot sleeve.

4. A portable jig saw according to claim 1, wherein the means securing the base plate to the housing includes positive locking means.

5. A portable jig saw according to claim 4, wherein the locking means for the base plate includes a screw securing the base plate to the housing and an eccentric disc about which the base plate is pivoted.

References Cited in the file of this patent

UNITED STATES PATENTS

| | | |
|---|---|---|
| 598,362 | Connelly | Feb. 1, 1898 |
| 1,620,374 | Maloney | Mar. 8, 1927 |
| 2,547,922 | Bechtold | Apr. 10, 1951 |